United States Patent [19]

Bayer et al.

[11] 4,055,685
[45] Oct. 25, 1977

[54] PROCESS FOR THE IMPROVEMENT OF THE ADHESION OF PHOTOGRAPHIC LAYERS TO A FILM WEB BY MEANS OF A CORONA TREATMENT

[75] Inventors: Günther Bayer, Leverkusen; Hans Georg Fitzky, Odenthal-Hahnenberg; Herbert Hoyer, Leverkusen; Günter Lüttgens, Langenfeld; Wolfgang Müller-Bardorff, Cologne, all of Germany

[73] Assignee: Agfa-Gevaert Aktiengesellschaft, Leverkusen, Germany

[21] Appl. No.: 680,100

[22] Filed: Apr. 26, 1976

[30] Foreign Application Priority Data

Apr. 30, 1975 Germany .............................. 2519233

[51] Int. Cl.$^2$ .................... G03C 1/78; G03C 1/96
[52] U.S. Cl. ..................... 96/87 R; 427/40; 427/371
[58] Field of Search ............... 96/87 R, 87 A; 427/35, 427/358, 371, 39, 40

[56] References Cited

U.S. PATENT DOCUMENTS

| 3,031,332 | 4/1962 | Ruthacker | 427/35 |
| 3,549,406 | 12/1970 | Ambusk | 427/40 X |
| 3,582,338 | 6/1971 | Yost et al. | 96/87 R |
| 3,697,305 | 10/1972 | Tatsuta et al. | 427/35 |
| 3,702,258 | 11/1972 | Gibbons et al. | 427/40 |
| 3,730,753 | 5/1973 | Kerr | 427/35 |
| 3,853,585 | 10/1974 | Tatsuta et al. | 96/87 R |
| 3,860,427 | 1/1975 | Matsuo et al. | 96/87 R |
| 3,983,301 | 9/1976 | Cook et al. | 427/40 X |
| 4,009,037 | 2/1977 | Mann et al. | 427/40 X |
| Re. 28,628 | 11/1975 | Carlson et al. | 427/35 |

OTHER PUBLICATIONS

Wechsberg et al, "Surface treatment of PE film by Electrical Discharge", Plastics Engineering, July 1959, p. 101.

*Primary Examiner*—Edward C. Kimlin
*Attorney, Agent, or Firm*—Connolly and Hutz

[57] ABSTRACT

Corona treatment involves the continuous subjection of the film web to a steady alternating current discharge. This treatment is carried out in two consecutive stages, the corona discharge frequency $f_1$ in the first stage being in the range $f_1 = $ 5 to 100 kHz and the corona discharge frequency $f_2$ in the second stage being in the range $f_2 = $ 500 to 2000 kHz.

5 Claims, 3 Drawing Figures

PROCESS FOR THE IMPROVEMENT OF THE ADHESION OF PHOTOGRAPHIC LAYERS TO A FILM WEB BY MEANS OF A CORONA TREATMENT

The invention relates to a process and a device for the corona treatment of a film web, in particular a polyethylene-coated paper web. The corona treatment involves the continuous exposure of the web to a steady alternating current corona discharge.

Papers coated on both sides with polyethylene are frequently used as emulsion carriers for photographic silver halide layers. In order to obtain uniform wetting with the aqueous gelatine silver halide emulsions and in the interests of friction free processing of such photographic papers in developing machines, the perfect wet adhesion of the gelatine layer to the backing is essential. To this end, before coating with the aqueous gelatine layer, the polyethylene surface is chemically and physically modified. Such a modification can for, example, be obtained by ion and electron bombardment in an electrical corona discharge influencing the polyethylene surface (see for example German Auslegeschrift 2 010 478). The subsequent reaction of the organic radicals formed by the removal of hydrogen ions and by breaking of the polymer chain with one another and with oxygen, ozone, nitrogen oxides, and water forms, inter alia, peroxides, ozonides, peracids, ketones, aldehydes, carboxylic acids. The substances are partly bonded to the surface of the layer, but are also present with low molecular weight in concentrated from in which they are gradually vaporisable; (see H.G. Fitzky, G-I-T Fachzeitschrift 18 (1974), 117/124, 199/200).

The object of corona treatment with hitherto regarded mainly as the formation of a sufficiently high concentration on the surface of the polyethylene of centres which could afford good anchoring in the polymer structure. Besides these fixed localised centres in corona treatment a broad spectrum of low molecular weight fragments is produced which should preferably be removed before the application of the photographic layers, because they tend at least partially to diffuse in these layers and can cause the formation of flaws and desensitisation in them. The low molecular weight products can be reduced in their effectiveness by evaporation, washing or by an intermediate layer.

In addition to the chemically active disruptive products an electrostatic charge pattern appears on the polyethylene layer, which when the gelatine layer coating takes place leads to corresponding surface structures, and also favours the production of high electrical charges with corresponding discharge phenomena when the web is moved. In order to eliminate this disadvantage, special discharge processes have been proposed (German Auslegeschrift 2 010 478 and German Offenlegungsschrift 2 044 828). The regulation of the conditions of the process is critical, and in practice optimum conditions are difficult to achieve.

An object of the invention is to intensify the known corona treatment process and at the same time to reduce flaws through the charging and production of low molecular derivatives. These requirements at first appear mutually irreconcilable. However, the invention provides surprisingly simple solution to the problem.

According to the invention there is provided a process for the corona treatment of a moving film web, in which the web is subjected to alternating current corona discharge in two consecutive stages, the frequency of the corona discharge in the first stage being from 5 to 100 kHz and the frequency in the second stage being from 500 to 2000 kHz. Preferably the corona frequency of the first stage is from 40 to 60 kHz and in the second stage is from 1000 to 1500 kHz.

Advantageously the web moves at a speed of from 0.5 to 1.5 m/sec, and the discharge current intensity is from 1 to 10 mA per cm. The invention also provides a device for the corona treatment of a moving film web, comprising a first stage having at least one pair of rollers connected to means for generating corona discharge between the rollers having a frequency of from 5 to 100 kHz, and a second stage having at least one pair of rollers connected to means for generating corona discharge between the rollers having a frequency of from 500 to 2000 kHz.

In one embodiment, one of the rollers of each pair is electrically conductive and earthed while the other roller has a metal core and is coated with a dielectric layer about 1 to 3 mm thick. The metal core of this roller is connected to an alternating voltage source. The corona discharge then arcs in the zone between the two rollers.

In a modified embodiment the rollers of the second corona stage are electrically and low-capacitance isolated from earth and are fed by two alternating voltages with their phases shifted at 180° symmetrical with respect to earth.

It has proved that by the selection of a suitable frequency in the first corona stage a particularly effective chemical modification of the polyethylene coated emulsion carrier is obtained. The optimum for this purpose lies at 5 to 8 kHz. In this respect the process according to the invention is superior to the processes known hitherto. The second corona treatment stage at a substantially higher frequency effects the removal of the low molecular weight derivatives from the first stage and simultaneously substantially neutralises the charge pattern produced by the first stage. Immediately after the corona treatment the web is passed through a coating apparatus in which it is coated with photographic silver halide emulsion. The quality and uniformity of the photographic materials are then a sensitive measure of the quality of the corona treatment.

An embodiment of the invention is described below with reference to the accompanying drawings, in which.

Figures 1, 2:
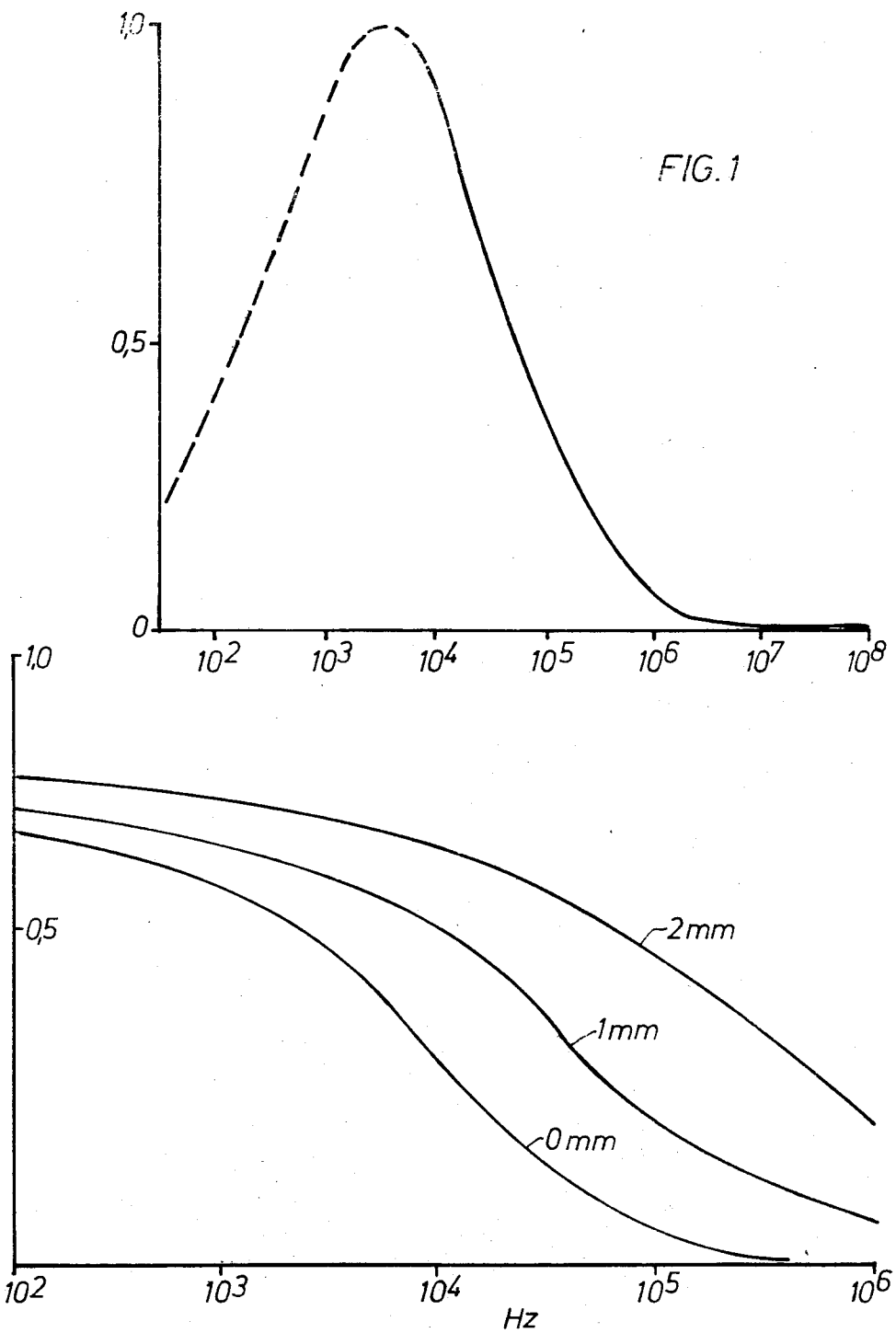
FIG. 1 shows the intensity of the chemical modification as a function of the frequency.
FIG. 2 shows the electrical homogeneity of the polyethylene layer on leaving the second corona treatment stage.

In FIG. 1 the ordinate is the degree of effectiveness of ozone formation in the corona discharge in an air atmosphere at 760 Torr at about 40% residual moisture. It has been shown by means of IR and ATR measurements and electron spin resonance investigations that the concentration of the ozone formed in the corona discharge represents a measure of the chemical effectiveness of the corona treatment. It can be seen from the diagram that a maximum in the ozone concentration is reached in the range about 5 to 8 kHz. At higher frequencies up to about 1 MHz the ozone content decreases monotonically to zero. The cause of this is the fact that as the frequency increases the gas discharge becomes less and less finally passing through zero, which leads to the thermal decomposition of initially formed ozone. As the frequency falls the degree of effectiveness of the ozone formation also decreases. Moreover, it has been found that at low frequencies of the order of 50 Hz, macroscopic breakdowns occur and they can be attributed to an over-long arc duration of the single discharge during a half wave.

The reason for the frequency dependence of the chemical effect of the corona treatment lies therefore principally in the frequency dependence of the ozone concentration. A further cause for the frequency dependence of the chemical effect is the increase in the local thickness of the chemically modified areas in the polyethylene surface which occur with increasing frequency at a given speed of the web. This effect therefore works against the influence of the ozone which decreases with increasing frequency (frequency range 5 to 70 kHz).

The frequencies $f_1$ and $f_2$ for the first and second corona stage are not chosen independently from one another. It has been found that the charge pattern in the polyethylene exhibits such a high degree of inhomogeneity at frequencies in the range $f_1 = 5$ to $20$ kHz in the first stage, that it cannot be completely erased by treatment in the second stage. It is therefore preferable in the first stage not to work with frequencies below 40 kHz.

The second corona stage serves to remove electrostatic charge inhomogeneities on the surface of the polyethylene emulsion carrier and to remove the low molecular weight derivatives from the first stage of the corona treatment. Thus the second stage eliminates the faults of the first corona stage. It is effected with substantially higher frequencies, i.e. with frequencies above 500 kHz. The selection of the frequency in the second stage is also dependent on the roller geometry. The size of the air gap in which the discharge arcs plays an important role. FIG. 2 shows the effect of the corona discharge in the second stage on the elimination of the inhomogeneity of the electrical surface fields in the polyethylene emulsion carrier as a function of the frequency for various sizes of the air gap in which the corona discharge arcs. To achieve this homogenisation frequencies above 500 kHz and an airgap of less than 0.5 mm is desirable. Ideally for the given roller arrangement (see also FIG. 3) frequencies should be around 1300 kHz. Above about 2500 kHz there occurs an aerodynamic instability of the discharge which increases with increasing frequency (measured up to 27,000 kHz). This is due to moving layers of air attached to the web. This causes an increase in the residual inhomogeneity of the charge pattern on the surface.

In addition to the homogenisation of the charge pattern and the removal of the low molecular weight derivatives, the corona treatment in the second stage also effects a favourable modification of certain unstable groupings of the polymer surface (e.g. splitting of peroxides). This modification is important in that if materials with a strong oxidising effect diffuse into the photographic layer during the immediately following coating of the emulsion carrier with photographic silver halide emulsions, they will there cause desensitisation or flaw formation. The suppression or reformation of compounds having an oxidising effect (for example peroxides and ozonides) can be achieved by using an oxygen free gas atmosphere, e.g. pure nitrogen. A pure nitrogen atmosphere in the corona discharge also favours the homogenisation of the charge pattern. A further possibility for removing peroxides is to use such high corona currents that a local temporary heating of the surface occurs.

Figure 3:
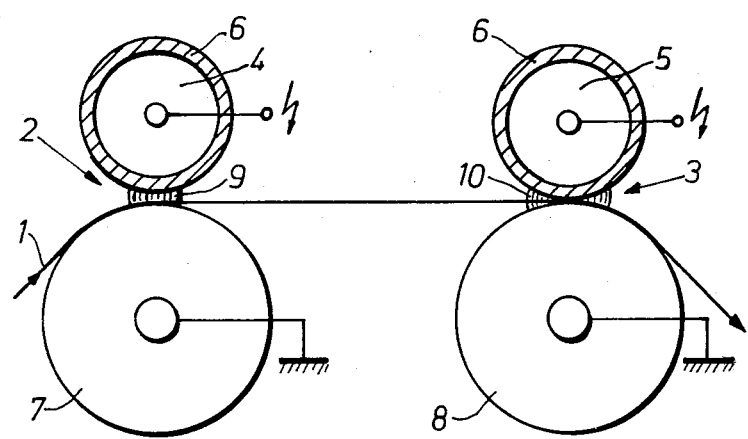
FIG. 3 is a schematic view of the two stage corona treatment apparatus.

An embodiment of the two stage corona treatment according to the invention of a polyethylene coated paper strip will now be described with reference to FIG. 3 which shows schematically an apparatus having two consecutive corona treatment stages. A polyethylene coated paper strip 1 passes through two roller systems 2 and 3 arranged one in front of the other and corresponding to the two corona stages, each system having from 2 to 4 pairs of rollers. One pair of rollers of each stage is shown in FIG. 3. The corona rollers 4 and 5 of the first and second stage are each connected to a high alternating voltage potential. Each roller is covered with a dielectric layer 6 of polytetrafluoroethylene 1 to 2 mm thick, and rotates at a circumferential speed equal to the speed of the web. The web speed is generally between 0.5 and 1.5 m/sec. Metal counter rollers 7 and 8 are located a short distance from the corona rollers 4 and 5, and the strip 1 loops partially around them. The counter rollers 7 and 8 are at earth potential. In the first corona stage 2 the air gap between the corona roller 4 and the counter roll 7 is from 0.5 to 2 mm to the polyethylene surface and in the second stage 0 to 0.5 mm. The dielectric covering of the corona roller improves the homogeneity of the corona discharge. With a metal conductive corona roller higher field gradients may occur as a result of the coarseness of the metal surface.

The corona discharge in the first stage is supplied by an alternating voltage with a frequency of 40 – 60 kHz and an amplitude of 8 – 15 kV. The corona current intensity is about 0.5 to 5 mA per cm of roller width. The discharge 9 arcs in the region of the minimum air gap.

The roller arrangement of both stages is accommodated in a gas tight housing (not shown) with entry and exit slots for the web ozone concentration measurements can be taken by spectroscopic and chemical means. The corona discharge 9 in the first stage is effect in air. A gas exchange takes place by means of constant circulation whereby the evaporated reaction products are also led away.

The charge pattern present in the polyethylene after treatment in the first corona stage 2 can for instance be rendered visible by a toner bath as in xerography. It consists basically of a statistically distributed structure of points with shading. The second corona stage 3 as stated above serves primarily to eliminate or homogenise the charge pattern. In the second corona stage the air gap between the corona roller 5 and the counter roller 8 is 0 to 0.5 mm. The corona roller is therefore practically in contact with the strip 1. The result of this is that the corona discharge 10 in the second stage arcs in two parts before and after the contact point of the corona roller 5 with the polyethylene surface. The small airgap produces a very high degree of homogeneity of the corona discharge (a very large number of individual discharges each of low energy). Homogeneity is further favoured by the use of a high alternating voltage frequency, e.g. 1300 kHz. A similar effect is produced by blowing pure nitrogen with an oxygen content of less than 0.01% through a longitudinal slot on both sides directly into the corona zone 10. The current intensities of the corona discharge in the second stage are 1 to 10 mA/cm. The supply voltage is about 4 kV. After this treatment the electrostatic charge pattern shows substantially complete homogeneity so that in the subsequent coating wetting faults are avoided. The temporary heating of the polyethylene surface is sufficient with the above mentioned electrical power to ensure the destruction of harmful peroxides. The temporary heating is also sufficient to evaporate quantitatively low molecular weight fragments of polyethylene originating in the first stage of the corona treatment.

In a modification of the corona treatment apparatus shown in FIG. 3 the rollers 5 and 8 in the second stage are fed symmetrically with respect to earth by two 180° phase shifted alternating voltages. Thus the counter roller 8 must then also be isolated from earth. The rollers 8 and 5 must both be constructed with a low capacitance to earth. Their earth capacitance should not exceed 200 pF.

Immediately after the second corona treatment stage 3 the polyethylene coated paper web 1 is fed to a coating apparatus and coated with a photographic gelatine silver halide emulsion. Many suitable coating apparatus are described in the literature (see, for example, German Patent Specification 1 303 763). A description of such coating apparatus is therefore not necessary here.

What we claim is:
1. A process for the corona treatment of a web of polyethylene coated photographic paper in which the web is subjected to alternating current corona discharge in two consecutive stages, the frequency of the corona discharge in the first stage being from 5 to 100 kHz and the frequency in the second stage being from 500 to 2000 kHz.
2. A process according to claim 1, wherein the frequency in the first stage is from 40 to 60 kHz and the frequency in the second stage is from 1000 to 1500 kHz.
3. A process according to claim 1 wherein the discharge current intensities are from 1 to 10 mA per cm and the web travels at a speed of 0.5 to 1.5 m/sec.
4. A process according to claim 1 wherein the corona discharge in the first stage takes place in air and in the second stage in air or in a pure nitrogen atmosphere.
5. A process according to claim 1 wherein the polyethylene coate paper web is coated immediately after the two stage corona treatment with a photographic silver halide emulsion.

* * * * *